J. F. OTT.
PROCESS OF PRODUCING RUBBER STRIPS.
APPLICATION FILED MAR. 28, 1907.
988,959.
Patented Apr. 4, 1911.
3 SHEETS—SHEET 3.
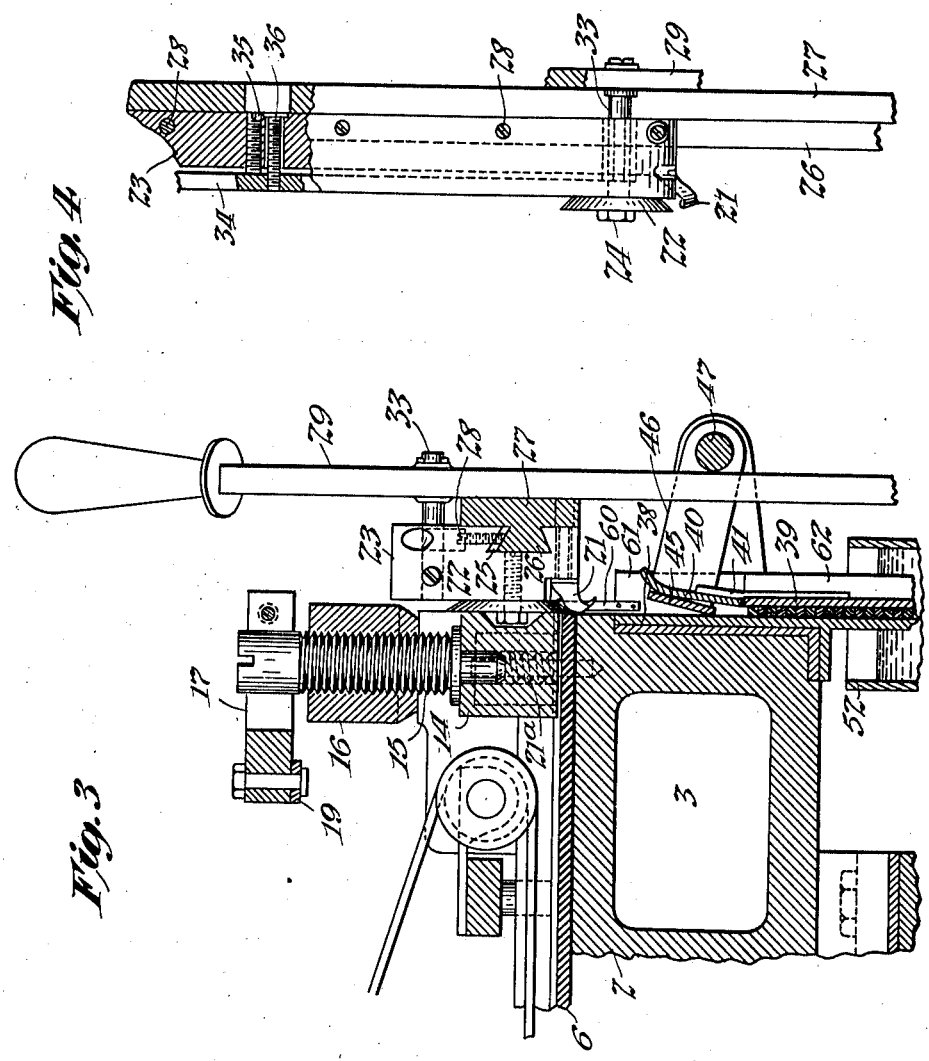

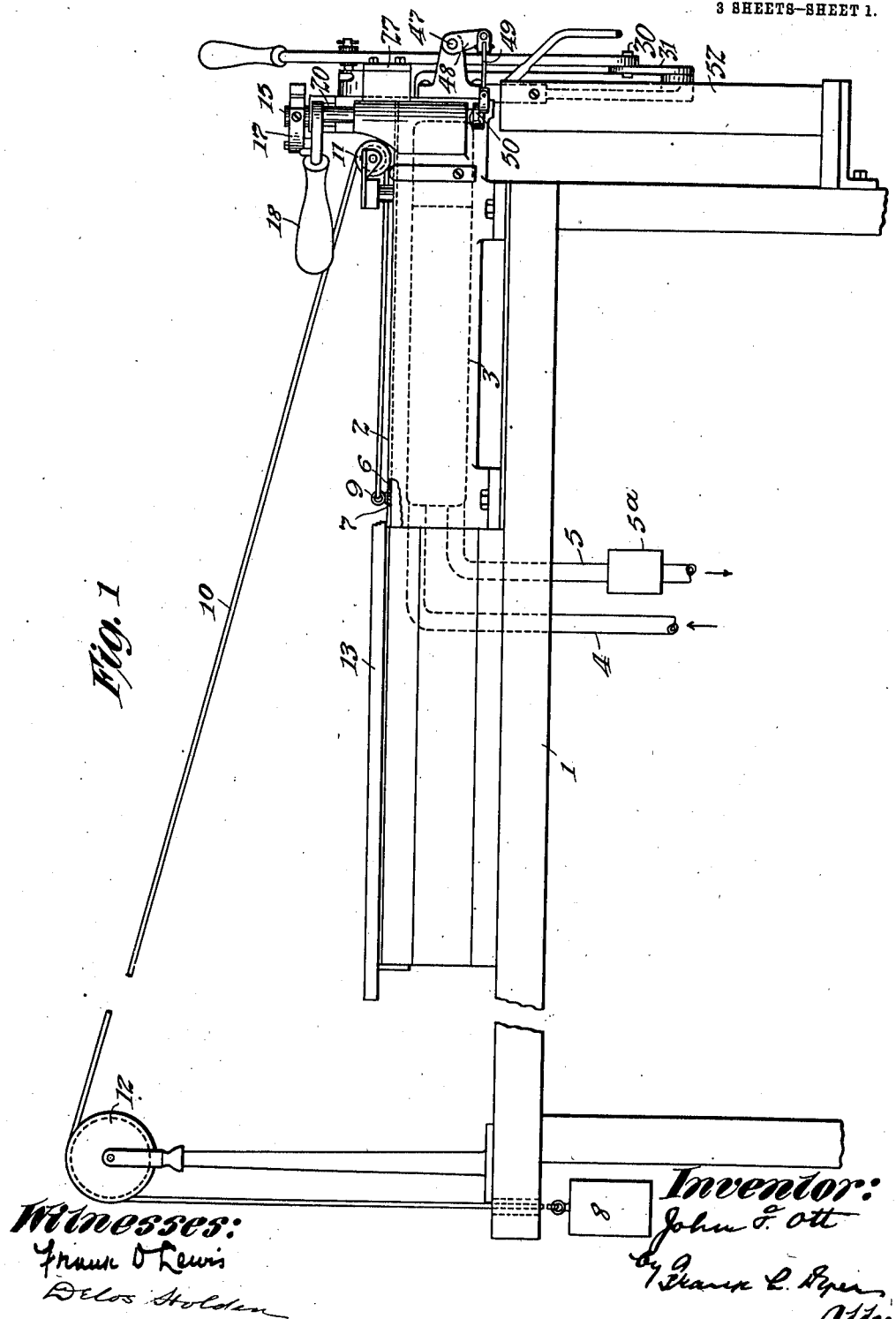

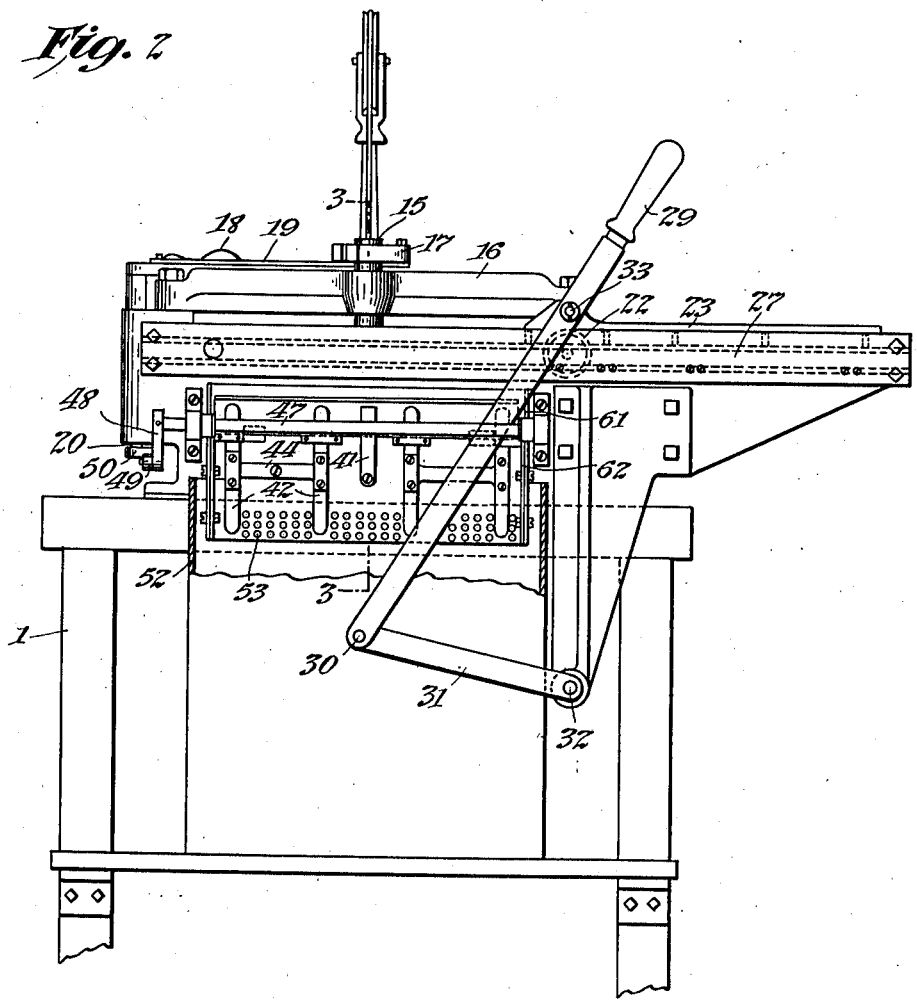

UNITED STATES PATENT OFFICE.

JOHN F. OTT, OF ORANGE, NEW JERSEY, ASSIGNOR TO EDISON STORAGE BATTERY COMPANY, OF WEST ORANGE, NEW JERSEY, A CORPORATION OF NEW JERSEY.

PROCESS OF PRODUCING RUBBER STRIPS.

988,959. Specification of Letters Patent. Patented Apr. 4, 1911.

Original application filed March 18, 1905, Serial No. 250,731. Divided and this application filed March 28, 1907. Serial No. 365,021.

*To all whom it may concern:*

Be it known that I, JOHN F. OTT, a citizen of the United States, residing at Orange, in the county of Essex and State of New Jersey, have invented certain new and useful Improvements in Processes of Producing Rubber Strips, of which the following is a description.

This application is a division of an application filed March 18th, 1905, Serial No. 250,731.

My invention relates to a process by means of which strips of hard rubber or similar material, preferably rectangular in cross section and free from warped or distorted portions, may be rapidly and cheaply produced from long continuous sheets of such material. Such strips as those referred to are useful for a number of purposes, but more particularly for separating adjacent plates of opposite polarity in storage batteries. Heretofore strips of this character have been produced with difficulty and at a high cost by a molding process.

I have discovered that it is possible to produce suitable strips by subjecting a sheet of material to a sufficient heat to soften the same, rigidly holding the sheet by means of a suitably applied clamping device, and then passing a knife or similar cutter through the material while it is still soft, and at a point where it is firmly held against yielding. Immediately after the strip is severed from the sheet, means are applied to the same for straightening it and for holding it in a straightened position until it is cool, the cooling being preferably hastened by a refrigerating device, such as a tank of cold water, the result being that the strip when released from the holding means is entirely cool and hard and remains permanently in the form desired.

My invention will now be more particularly described and claimed.

Reference is hereby made to the accompanying drawings in which the same reference numerals are used to designate corresponding parts in the several views, of which—

Figures 1 and 2 are respectively side and end elevations of a suitable apparatus which end be used in carrying out my invention; Fig. 3 is a section on line 3—3 of Fig. 2, and Fig. 4 is a detail view showing in plan partly in section, the cutter, cutter slide, gage, guide and operating lever.

The apparatus shown comprises a supporting frame 1 of any suitable form carrying a table 2 upon which the sheet of material 6 is laid and over which it progresses toward the cutter. The top of the table has a countersunk portion whose width is equal to that of the strip, and the latter occupies the same. It is necessary that this table be kept at a sufficient heat to cause the material to be thoroughly softened by the time it reaches the cutter. In order to accomplish this, I preferably form the same with a steam chamber 3 provided with an inlet 4 for admitting steam under ordinary pressure, and an outlet 5 for the escape of the condensed steam. The outlet pipe 5 is provided with a steam trap 5ª of any approved form which allows the water, formed by condensation, to be blown off whenever the temperature falls below a given point, for instance, 105 degrees centigrade, thereby maintaining a practically constant, high temperature in the chamber 3.

The material to be treated is in the form of a long sheet 6, the width of which is practically the same as that of the depressed portion of the table, and equal to the length of the strips which are to be produced. As each strip is removed from the forward edge of the sheet by the cutter, it is necessary that the sheet be fed forward. For this purpose I provide a holder 7 (see Fig. 1) which receives the rear edge of the sheet and is caused to press against the same by means of a weight 8 connected to the holder-ring 9 by means of a rope or wire 10, passing over the pulleys 11 and 12. This feed mechanism provides a constant pressure upon the sheet 6 since it is independent of the length of the sheet. In order to prevent bending or buckling of the said sheet, the boards 13 are placed thereon, said boards being separated by a longitudinal space of sufficient width to allow the ring 9 to be carried along as the material is fed forward. These boards perform also the additional function of a blanket for the material which is to be cut, so that it remains in a warm and soft condition, suitable for being operated upon.

The cutting operation takes place at the forward edge of the table 2, the arrangement of parts being clearly shown in Fig. 3. A vertically movable clamping block 14 is situated directly above the material 6 at the forward edge of the table 2. This block is provided for the purpose of firmly holding the softened material while the cutter is operating to sever the same. The block is forced down upon the material with suitable pressure, by means of a screw 15 threaded in a bridge 16, which is bolted to the table 2 as shown in Fig. 2. The screw 15 is operated by means of a crank 17 operated by a hand lever 18 through the connecting link 19. The hand lever 18 simultaneously operates a vertical rock shaft 20 for a purpose which will be hereinafter referred to. When the handle 18 is moved in one direction it is obvious that the clamping block 14 will be pressed against the material 6 with considerable force. When the handle 18 is moved in the opposite direction the screw 15 moves upward and the block 14 follows the screw by reason of the coil springs 21ᵃ at each end thereof, see Fig. 3.

The cutter preferably consists of a circular knife 22 bolted firmly to the slide 23 by means of a bolt 24. The slide 23 is provided with a dove-tail groove 25 which receives a horizontal rib 26 of corresponding shape, which is formed upon a bar 27 extending transversely across the forward end of the machine and bolted rigidly to the supporting frame work, as shown in Figs. 2 and 3. Screws 28 are threaded in the slide 23 and bear against the upper surface of the rib 26, thus preventing any lost motion between the rib and the groove and providing an adjustment for wear of these parts. It will be seen that the knife 22 moves in a horizontal path immediately in front of and in shearing relation to the forward edges of the table 2 and block 14, the cutting edge extending slightly below the upper surface of the table. The slide 23 is operated by means of a hand lever 29 pivoted at 30 to a link 31, which in turn is pivoted at 32 to the supporting frame work. The slide 23 carries a pin 33 upon which the upper end of the operating lever 29 is rotatably mounted.

The width of the strip which is to be severed is determined by means of the gage 34 carried by the slide 23 and adjustable toward and away from the slide by means of a series of screws 35 and 36, clearly shown in Fig. 4. One end of the slide 23 carries a piece 21 of spring metal for the purpose of deflecting the strip as it is formed and freeing the knife from the end of the strip after the same has been completely severed from the sheet 6. The portion of the sheet which projects to form the strip is held against lateral movement by a rectangular pin 60 projecting upwardly from the forwardly extending flange 61 of the plate 38 which is secured to the body of the machine. The rear side of this pin is beveled to permit the passage of the knife (see Fig. 3). Obviously this pin will prevent the severed strip from being carried along by the knife, and will insure its dropping into the receptacle now to be described. It also prevents yielding during the cutting operation of that portion of the sheet which is to form the strip.

The means for straightening and holding the strips while cooling is composed of two parallel vertical plates 38 and 39, having forwardly extending lateral flanges 61 and 62 respectively which are bolted together (see Fig. 2). An inclined plate 40 is secured to the upper portion of the plate 39 by means of an elastic or spring strip 41 and forms with the upper part of the plate 38 a hopper for receiving the strips as they fall from the knife. The plate 39 is provided with openings in which are located presser plates 42 carried on opposite ends of a supporting spring strip 44, the said spring serving to press the plates 42 against the cut strips, thereby pressing the latter against the plate 38. The strips are packed into the holder just described by means of an oscillating packer 45 consisting of a plate of about the same length as the strips and holding plates 38, 39 and carried by the supporting arms 46 fixed to a rock shaft 47. This shaft is oscillated by means of a crank 48, link 49 and crank 50, the latter being fixed to the lower end of the shaft 20, hereinbefore described. By this means the packer 45 is given one downward packing movement every time the clamping block 14 is raised or lowered, which is of course, as often as the cutter is operated to remove a strip of material from the sheet 6.

The lower portions of the holding plates 38 and 39 extend into a tank 52 containing cold water for the purpose of cooling the strips while they are in the holder, whereby they will become hardened while held in the desired shape which they retain when removed from the holder, said lower portions of the said plates 38 and 39 being preferably provided with perforations 53 in order to expose the strips more effectively to the action of the water. The operation of the packer forces the strips down between the plates 38 and 39 until they eventually pass from between the lower edges of said plates into the lower portion of the tank 52.

The operation of the device is briefly as follows: A sheet 6 of hard rubber or similar material is laid upon the heated table 2 being held down thereon and protected by means of boards 13. The clamping block 14 being in its elevated position, the sheet 6 is moved forward by means of the weight 8 operating through the wire 10 and holder 7 until the forward edge of the sheet abuts against the gage 34. The hand lever 18 is now operated to press the block 14 firmly down upon the material 6. The hand lever 29 is then operated (from left to right in Fig. 3) so as to carry the knife 22 along the forward edges of the block 14 and table 2 and through the material 6, whereby a strip of material is severed therefrom and falls into the hopper between the plates 40 and 38. The next movement of the hand lever 18 causes the packer 45 to press the strip down between the plates 38 and 39, whereby the strip being still soft is straightened. The forcing of the successive strips down into the holder, causes them to travel down vertically between the plates 39 until they reach the tank 52 containing cold water by which they are chilled and hardened while still in the holder and the strips are eventually forced from between the lower edges of the said plate into the lower portion of the tank 52.

Having now described my invention, what I claim as new therein and desire to secure by Letters Patent is as follows:

1. The process of preparing strips of hard rubber and like material free from distortion, which consists in subjecting the material to heat whereby it is softened, rigidly holding the same, passing a cutter through the material in close proximity to the holding means and straightening the severed portion before it hardens, substantially as set forth.

2. The process of preparing strips of hard rubber and like material free from distortion, which consists in subjecting the material to heat whereby it is softened, rigidly holding the same, passing a cutter through the material in close proximity to the holding means, straightening the severed portion and then cooling the same, substantially as set forth.

3. The process of preparing strips of hard rubber and like material, which consists in subjecting the material to heat whereby it is softened, rigidly holding the same at one edge of the sheet, passing a cutter through the material from side to side of the sheet in close proximity to the holding means and straightening the severed portion before it cools, substantially as set forth.

4. The process of preparing strips of hard rubber and like material, which consists in subjecting the material to heat to soften the same, rigidly holding the material, passing a cutter through the material in close proximity to the holding means, and straightening and cooling the severed portion, substantially as set forth.

5. The process of preparing strips of insulating material free from distortion, which consists in softening the material by application of heat, cutting the material while soft while holding it rigidly close to the line of severance, removing any unevenness in the severed strips by pressure applied in a form to the material while soft, and hardening the strip by application of cold to the strip while still under pressure, substantially as set forth.

6. The process of preparing strips of hard rubber and like material, which consists in softening strips of the material by heat and cutting the strips therefrom to size, passing the severed strips continuously through a form under pressure to remove distortion, and cooling the strips in the form, substantially as set forth.

7. The process of forming undistorted strips of rectangular cross-section of material which softens under heat and hardens under application of cold which consists in heating the strips, passing them continuously through a yielding form under pressure, and then applying cold to the strips before their passage from the form, substantially as set forth.

8. The process of forming undistorted strips of material which softens under application of heat, which consists in progressing the strips continuously under pressure applied on all sides of the strips, and then applying cold to the strips, substantially as set forth.

9. The process of forming undistorted strips of material which softens under application of heat, which consists in progressing the strips continuously in one direction under pressure applied on all sides of the strips, and then applying cold to the strips while still under pressure, substantially as set forth.

This specification signed and witnessed this 27th day of March 1907.

JOHN F. OTT.

Witnesses:
 FRANK L. DYER,
 FRANK D. LEWIS.